United States Patent
Biskeborn et al.

(10) Patent No.: US 9,406,319 B1
(45) Date of Patent: Aug. 2, 2016

(54) ELECTRICALLY NON-CONDUCTIVE MAGNETIC SHIELD LAMINATE STRUCTURE FOR CONTACT RECORDING SENSOR

(71) Applicant: International Business Machines Corporation, Armonk, NY (US)

(72) Inventors: Robert G. Biskeborn, Hollister, CA (US); Calvin S. Lo, Saratoga, CA (US); Andrew C. Ting, El Prado, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/752,933

(22) Filed: Jun. 27, 2015

(51) Int. Cl.
| | |
|---|---|
| *G11B 5/39* | (2006.01) |
| *G11B 5/255* | (2006.01) |
| *G11B 5/008* | (2006.01) |
| *G11B 5/31* | (2006.01) |
| *G11B 5/11* | (2006.01) |
| *G11B 5/115* | (2006.01) |

(52) U.S. Cl.
CPC ............ *G11B 5/255* (2013.01); *G11B 5/00813* (2013.01); *G11B 5/11* (2013.01); *G11B 5/115* (2013.01); *G11B 5/3143* (2013.01); *G11B 5/3146* (2013.01); *G11B 5/3912* (2013.01)

(58) Field of Classification Search
CPC ........ G11B 5/11; G11B 5/115; G11B 5/3143; G11B 5/3146; G11B 5/3912
USPC ................................ 360/314, 316, 319, 324.2
See application file for complete search history.

(56) References Cited

U.S. PATENT DOCUMENTS

| | | | |
|---|---|---|---|
| 4,610,935 A | 9/1986 | Kumasaka et al. | |
| 5,838,521 A | 11/1998 | Ravipati | |
| 5,963,401 A * | 10/1999 | Dee ...................... | G11B 5/3903 360/316 |
| 6,292,334 B1 | 9/2001 | Koike et al. | |
| 6,760,198 B2 | 7/2004 | Jarratt | |
| 8,470,463 B2 | 6/2013 | Wessel et al. | |
| 8,531,801 B1 * | 9/2013 | Xiao .................... | G11B 5/3909 360/319 |
| 8,638,530 B1 | 1/2014 | Hsu et al. | |
| 8,760,819 B1 | 6/2014 | Liu et al. | |
| 8,780,505 B1 | 7/2014 | Xiao | |
| 8,797,692 B1 * | 8/2014 | Guo ...................... | G11B 5/3909 360/319 |
| 8,830,635 B2 | 9/2014 | Watanabe et al. | |
| 8,873,204 B1 * | 10/2014 | Gao ...................... | G11B 5/3912 360/319 |
| 8,891,207 B1 * | 11/2014 | Li ......................... | G11B 5/115 360/121 |

(Continued)

OTHER PUBLICATIONS

List of IBM Patents or Patent Applications Treated As Related.

(Continued)

*Primary Examiner* — Jefferson Evans
(74) *Attorney, Agent, or Firm* — Zilka-Kotab, PC

(57) ABSTRACT

An apparatus according to one embodiment includes a magnetic sensor structure, a magnetic shield having at least one laminate pair comprising a magnetic layer and an electrically nonconductive nonmagnetic layer, and a nonmagnetic spacer layer between the sensor structure and the magnetic shield. An apparatus according to another embodiment includes a sensor structure and a magnetic shield having a conductive portion and a nonconductive portion, the nonconductive portion having at least one laminate pair comprising a magnetic layer and an electrically nonconductive nonmagnetic layer.

17 Claims, 14 Drawing Sheets

(56) References Cited

U.S. PATENT DOCUMENTS

| | | | |
|---|---|---|---|
| 8,908,333 B1* | 12/2014 | Rudy | G11B 5/115 360/319 |
| 8,941,954 B2 | 1/2015 | Le et al. | |
| 9,013,836 B1* | 4/2015 | Liu | G11B 5/115 360/319 |
| 2002/0064002 A1 | 5/2002 | Gill | |
| 2007/0195467 A1* | 8/2007 | Gill | B82Y 25/00 360/319 |
| 2008/0170335 A1* | 7/2008 | Iben | G11B 5/11 360/319 |
| 2010/0103563 A1* | 4/2010 | Machita | B82Y 10/00 360/316 |
| 2011/0069417 A1 | 3/2011 | Kawamori et al. | |
| 2012/0281319 A1* | 11/2012 | Singleton | G01R 33/093 360/319 |
| 2015/0248903 A1* | 9/2015 | Aoyama | G11B 5/3912 360/99.08 |

OTHER PUBLICATIONS

Notice of Allowance from U.S. Appl. No. 14/752,931, dated Apr. 4, 2016.
Biskeborn et al., U.S. Appl. No. 15/175,980, filed Jun. 7, 2016.
Biskeborn et al., U.S. Appl. No. 15/175,903, filed Jun. 7, 2016.
Biskeborn et al., U.S. Appl. No. 14/752,931, filed Jun. 27, 2015.
Non-Final Office Action from U.S. Appl. No. 14/752,931, dated Oct. 7, 2015.

* cited by examiner

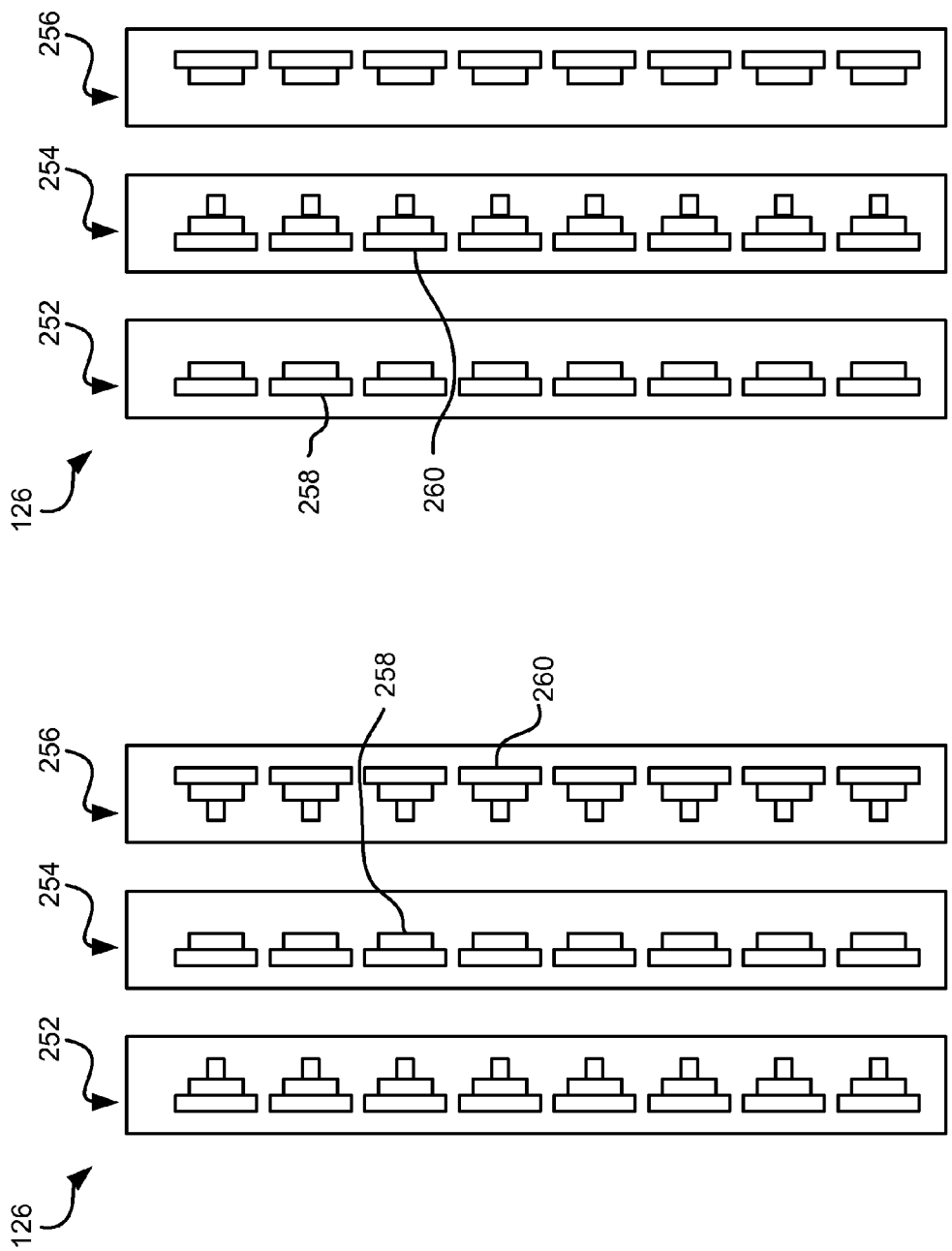

ELECTRICALLY NON-CONDUCTIVE MAGNETIC SHIELD LAMINATE STRUCTURE FOR CONTACT RECORDING SENSOR

BACKGROUND

The present invention relates to data storage systems, and more particularly, this invention relates to the prevention of shorting and/or erosion in tape heads.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

BRIEF SUMMARY

An apparatus according to one embodiment includes a magnetic sensor structure, a magnetic shield having at least one laminate pair comprising a magnetic layer and an electrically nonconductive nonmagnetic layer, and a nonmagnetic spacer layer between the sensor structure and the magnetic shield.

An apparatus according to another embodiment includes a sensor structure and a magnetic shield having a conductive portion and a nonconductive portion, the nonconductive portion having at least one laminate pair comprising a magnetic layer and an electrically nonconductive nonmagnetic layer.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof. Various embodiments disclosed herein include laminated shields.

In one general embodiment, an apparatus includes a magnetic sensor structure, a magnetic shield having at least one laminate pair comprising a magnetic layer and an electrically nonconductive nonmagnetic layer, and a nonmagnetic spacer layer between the sensor structure and the magnetic shield.

In another general embodiment, an apparatus includes a sensor structure and a magnetic shield having a conductive portion and a nonconductive portion, the nonconductive portion having at least one laminate pair comprising a magnetic layer and an electrically nonconductive nonmagnetic layer.

Figure 1A:
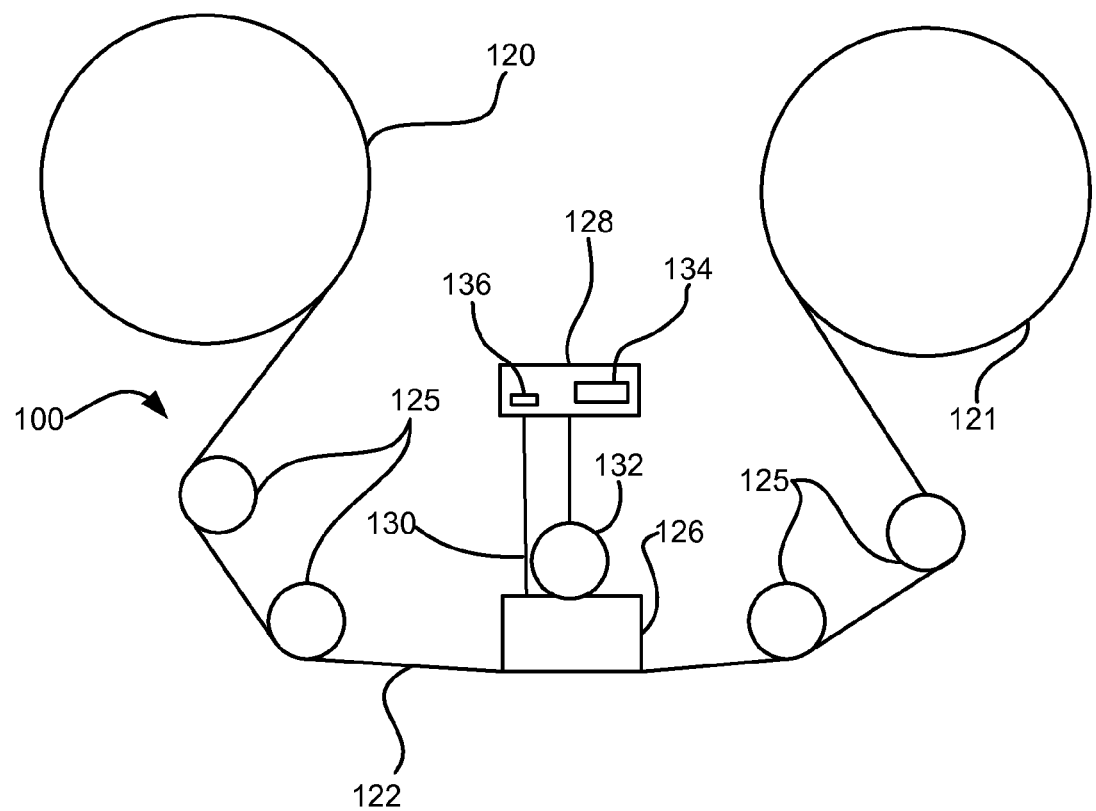
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
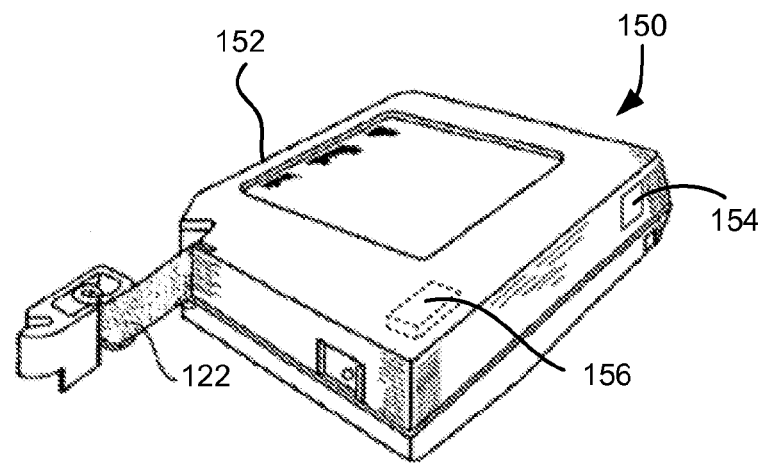
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
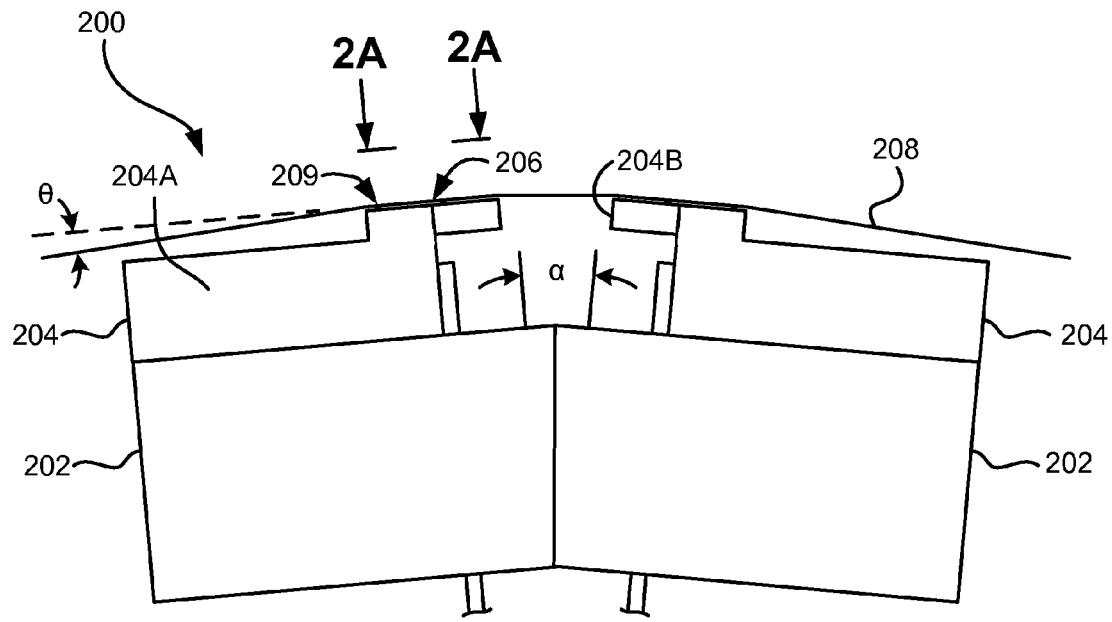
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
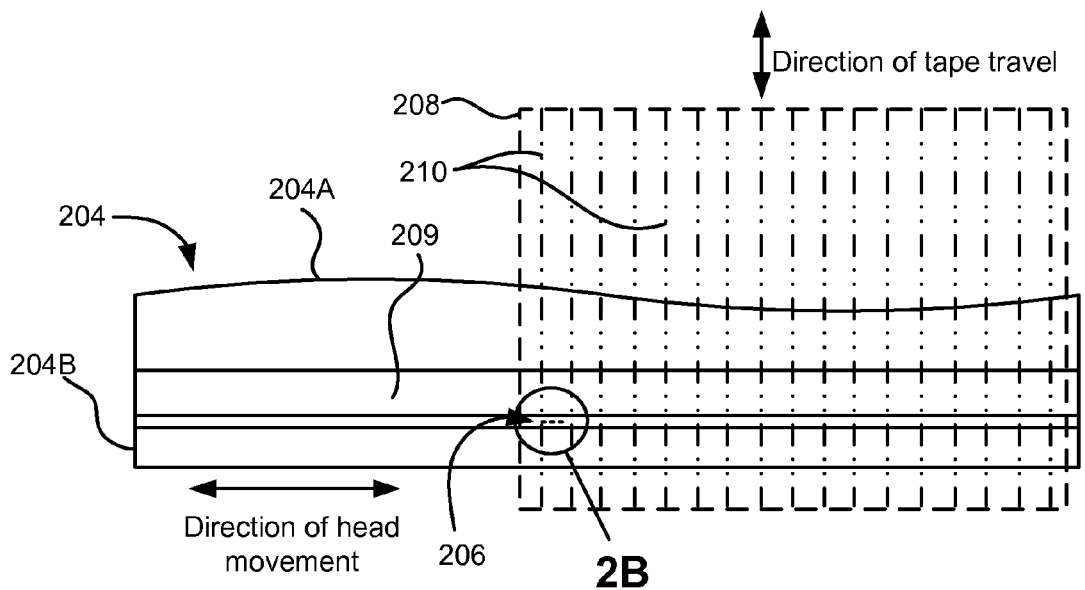
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
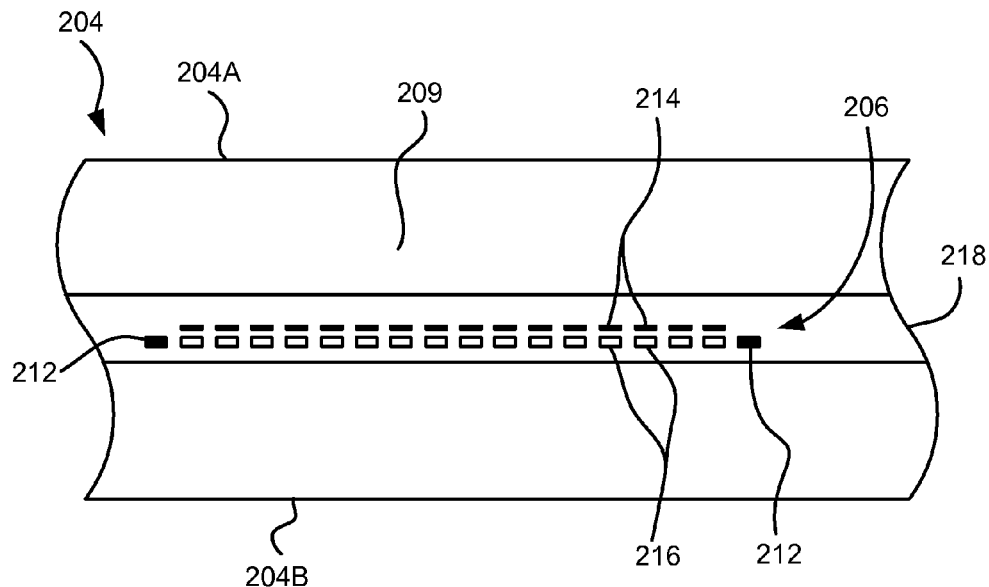
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
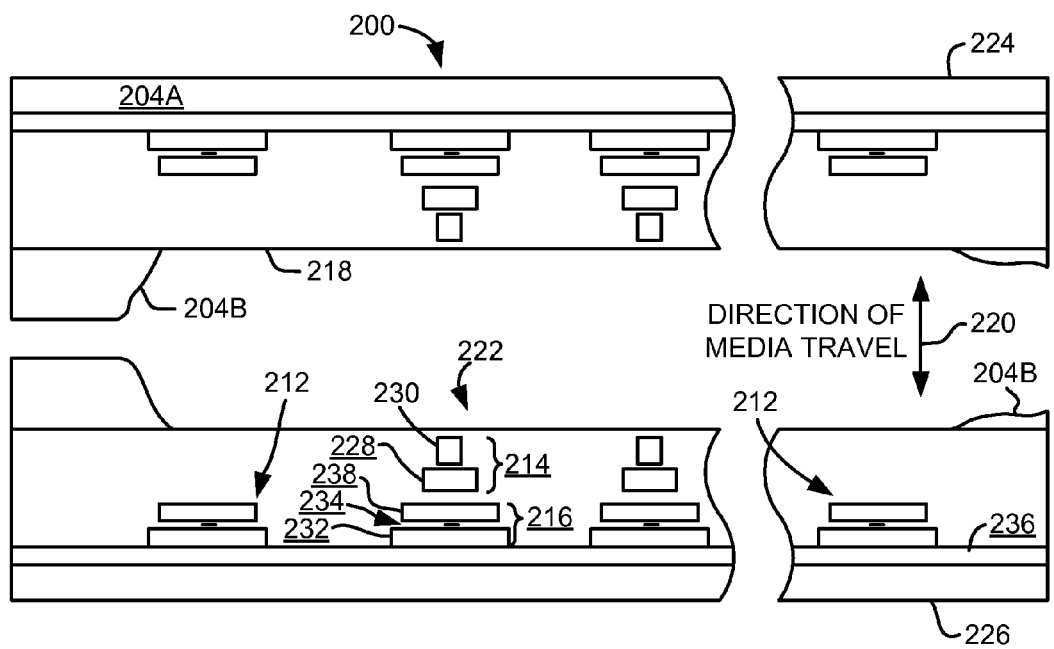
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe(—), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, Giant magnetoresistance (GMR), anisotropic magnetoresistance (AMR), tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
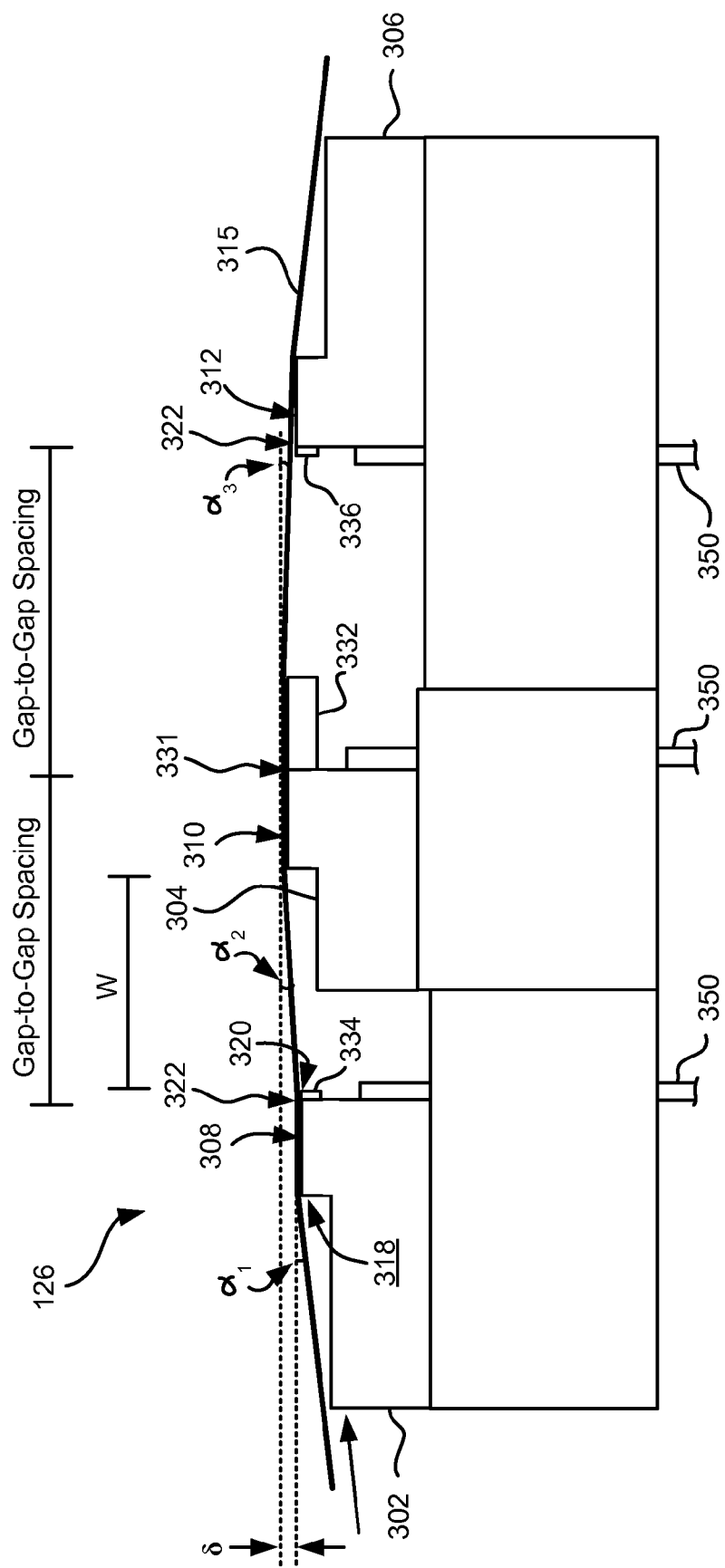
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
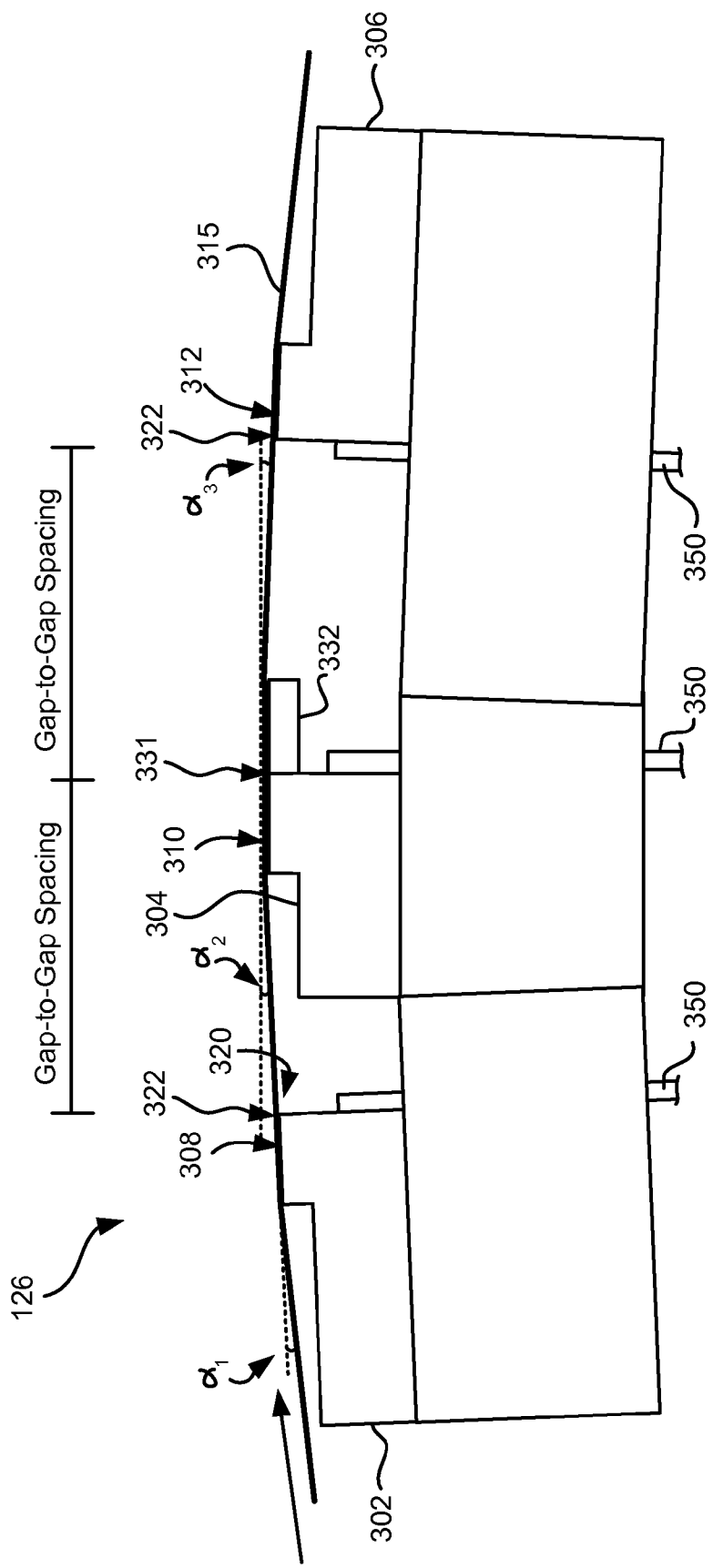
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
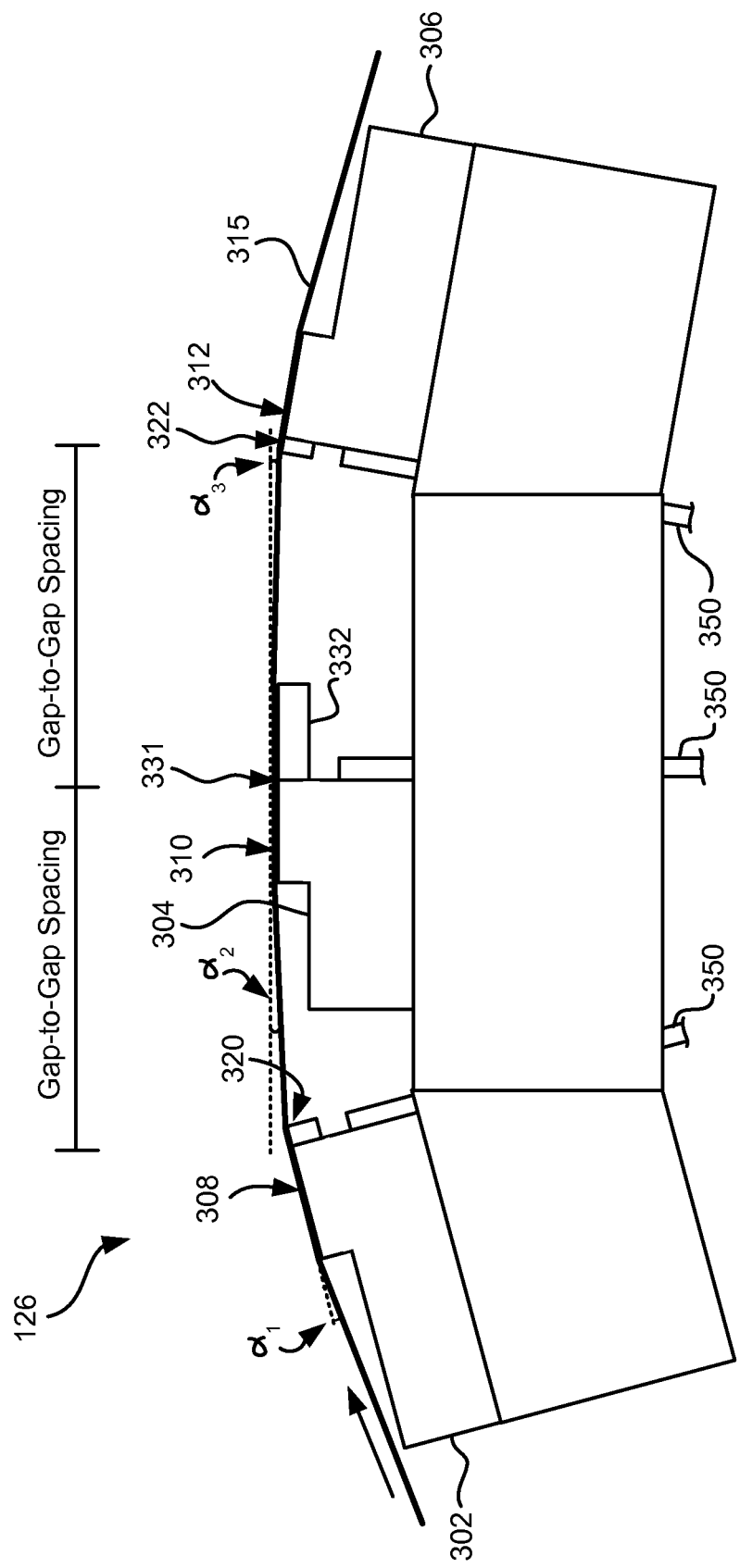
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

As mentioned above, contact recording systems such as tape drive systems move media such as magnetic tapes over the surface of the read and/or write heads at high speeds. Tape drive systems usually implement a minimized spacing between the head and the tape. However, as tape is passed over magnetic heads in conventional products, defects such as asperities or localized abrasive bumps on the surface of the tape itself may create electrical shorts by smearing and/or scratching conductive material across the tape head, such as across a read sensor. As a result, conventional products may experience shorting of read sensors and consequential inoperability thereof after ordinary use, particularly with new, unworn media.

In sharp contrast, tape drive systems described herein may include one or more magnetic layer and electrically nonconductive nonmagnetic layer pairings to protect the tape head, e.g., from erosion, smearing and/or scratches, which would otherwise cause electrical shorting events, etc.

Figure 8:
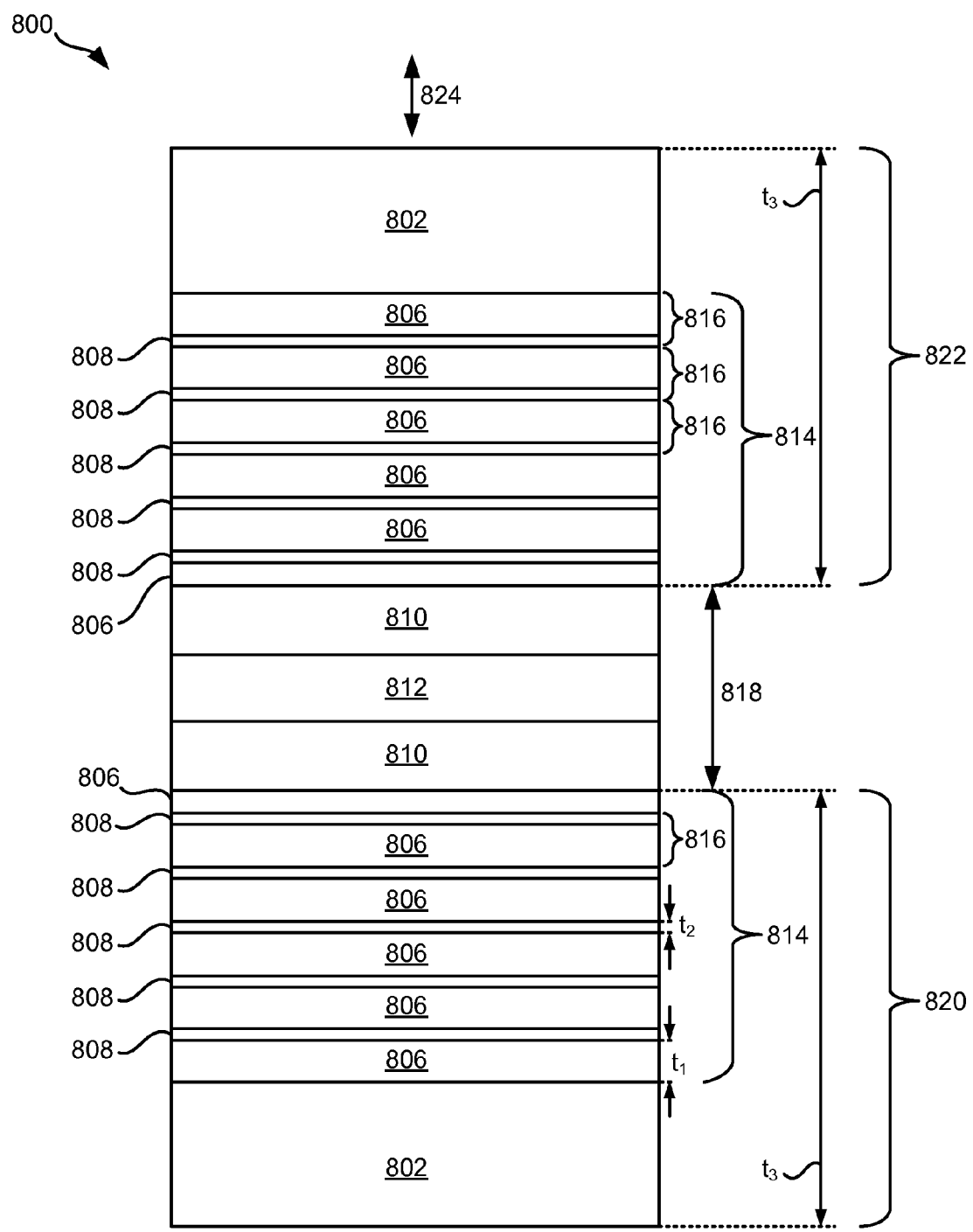
FIG. 8 is a partial side view of a media facing side of an apparatus according to one embodiment.

FIG. 8 depicts an apparatus 800 in accordance with one embodiment. As an option, the present apparatus 800 may be implemented in conjunction with features from any other embodiment listed herein, such as those described with reference to the other FIGS. Of course, however, such apparatus 800 and others presented herein may be used in various applications and/or in permutations which may or may not be specifically described in the illustrative embodiments listed herein. Further, the apparatus 800 presented herein may be used in any desired environment.

Apparatus 800 includes a magnetic sensor structure 812. In preferred embodiments the magnetic sensor structure 812 may be a current perpendicular to plane (CPP) sensor structure e.g. which may include an electrical connection to the sensor. According to an exemplary approach, the magnetic sensor structure 812 may be a magnetic tunnel junction sensor structure. Accordingly, in some approaches the magnetic sensor structure 812 may include a tunnel barrier layer of a type known in the art. It follows that, depending on the desired embodiment, additional layers may be present in the magnetic sensor structure 812 as would be appreciated by one skilled in the art upon reading the present description. Moreover, unless otherwise specified, the various layers in the magnetic sensor structure 812 and other embodiments may be formed using conventional processes.

Apparatus 800 further includes a magnetic shield 820 below the magnetic sensor structure 812 and a second magnetic shield 822 above the magnetic sensor structure 812. Additionally, a nonmagnetic spacer layer 810 may be included between the sensor structure 812 and the magnetic shield 820. The nonmagnetic spacer layer 810 may assist in setting the shield to shield spacing 818, which may generally correspond to the linear data density of a data track readable by the apparatus 800. The nonmagnetic spacer layer 810 may be electrically conductive as in the case of a tunnel valve structure, or nonconductive as in a current parallel to plane structure.

The nonmagnetic spacer layer 810 may include Ir, NiCr, Ru, Ta, etc., and/or other nonmagnetic spacer layer materials of a type known in the art. Furthermore, distal portions of the nonmagnetic spacer layer 810 may include plated permalloy, e.g., in order to facilitate wafer processing. An illustrative thickness of the nonmagnetic spacer layer 810 may be about 1-3 nanometers, but could be higher or lower depending on the embodiment. In some embodiments, each nonmagnetic spacer layer 810 is thicker than the nonmagnetic layers 808 in the laminate pairs.

The magnetic shield 820 in various embodiments may optionally have a non-laminated magnetic portion 802 (which can be formed using, e.g., plating, sputtering, etc.; and preferably by plating for films thicker than 0.3 microns) and a laminated portion 814. The laminated portion 814 may include one, but preferably includes at least two laminate pairs 816, where each laminate pair 816 includes a magnetic layer 806 paired with an electrically nonconductive nonmagnetic layer 808. However, according to various embodiments, the magnetic shield 820 may include one, at least three, at least four, at least six, ten or more, multiple, etc. laminate pairs 816, but could include more or fewer, e.g., depending on fabrication limitations, material characteristics, etc.

Because the laminate pairs 816 are electrically nonconductive, only a portion of the shield may be used as a lead in a CPP sensor structure in some embodiments, e.g., as where a magnetic layer 806 is proximate the spacer layer 810, as would be appreciated by one skilled in the art upon reading the present description.

One or more of the magnetic layers 806 may include permalloy, CZT, magnetically similar alloys, etc., and/or other magnetic materials of a type known in the art such as Fe(N). Moreover, one or more of the electrically nonconductive nonmagnetic layers 808 may include Alumina ($Al_2O_3$), Chrome Oxide ($CrO_x$), Silicon Nitride ($Si_3N_4$), Titanium Oxide ($TiO_x$), Magnesium Oxide (MgO), etc., and/or other relatively dense, hard and/or non-ductile electrically nonconductive nonmagnetic materials of a type known in the art. It should be noted that while the electrically nonconductive nonmagnetic materials used to form some of the electrically nonconductive nonmagnetic layers 808 of the two or more laminate pairs 816 may share the same material type (e.g., some of the electrically nonconductive nonmagnetic layers 808 may include the same materials), the electrically nonconductive nonmagnetic materials used to form other electrically nonconductive nonmagnetic layers 808 of the two or more laminate pairs 816 may vary from one another, depending on the desired embodiment. Similarly, the magnetic materials used to form some of the magnetic layers 806 among the two or more laminate pairs 816 may be the same, while the magnetic materials used to form other magnetic layers 806 among the two or more laminate pairs 816 may differ between the two or more laminate pairs 816.

Implementing a laminated portion 814 having several laminate pairs 816 allows for improved overall shield characteristics. For example, the electrically nonconductive nonmagnetic layers 808 may implement robust materials thereby providing the magnetic shield 820 improved resistance to wear, while the magnetic layers 806 may preserve the magnetic functionality of the magnetic shield 820.

It follows that laminate pairs 816 may prevent substantial wear of the tape head in areas where media, e.g., tape passes over the head without hindering performance. This improved resistance to wear provided by the smear-resistant and/or abrasion-resistant magnetic shield configurations described herein, e.g., such as the configuration of apparatus 800, is particularly desirable in view of the continued efforts to reduce track widths and more particularly the space between magnetic shields and the separation between head and tape.

Moreover, the inventors discovered that the magnetic shielding properties of the magnetic shields 820, 822 may be enhanced by implementing laminate pairs 816 having layers with thicknesses within certain ranges.

Preferred deposition thicknesses of some of the layers of apparatus 800 will now be disclosed. It is generally preferred that a deposition thickness ($t_1$) of the magnetic layers 806 in each laminate pair 816 is greater than a deposition thickness ($t_2$) of the nonconductive nonmagnetic layers 808 of the laminate pairs 816. For example, the deposition thickness $t_2$ of the nonconductive nonmagnetic layer 808 in each laminate pair 816 may be about 10% or less of a total deposition thickness of the laminate pair 816. Accordingly the deposition thickness $t_1$ of the magnetic layer 806 in each laminate pair 816 may be about 90% or more of a total deposition thickness of the laminate pair 816.

According to an illustrative range, the magnetic layer 806 in each laminate pair 816 may have a deposition thickness $t_1$ that is between about 2 and about 100 nanometers, more preferably between about 20 and about 75 nanometers, but may be higher or lower depending on the desired embodiment. For example, the deposition thickness of magnetic layer 806 described herein may vary to ensure that apparatus 800 has low coercivity (Hc) in both easy and hard axis directions. Furthermore, the deposition thickness of magnetic layer 806 may vary to ensure a high magnetic moment in apparatus 800. For example a high magnetic moment may correspond to greater than approximately 1 Tesla (T).

Furthermore, each of the magnetic layers 806 in each laminate pair 816 may vary in deposition thickness, deposition material(s), fabrication process, etc., from one another in embodiments which include more than one laminate pair 816.

The nonconductive nonmagnetic layer 808 in each laminate pair 816 may have a deposition thickness $t_2$ that is between about 1 and about 12 nanometers. According to preferred embodiments, the nonconductive nonmagnetic layer 808 in each laminate pair 816 may have a deposition thickness $t_2$ that is less than about 8 nanometers. A nonconductive nonmagnetic layer 808 thickness in each and/or some laminate pairs 816 of less than about 8 nanometers was found to provide better shielding than a comparable structure having a monolithic shield of the magnetic material.

However, according to some embodiments, one or more of the nonconductive nonmagnetic layers 808 may have a deposition thickness $t_2$ greater than 12 nanometers, e.g., to provide a strong structural integrity of apparatus 800. Furthermore, the nonconductive nonmagnetic layers 808 in the various laminate pairs 816 may vary in deposition thickness, deposition material(s), fabrication process, etc., from one another in embodiments which include more than one laminate pairs 816.

In order to further improve magnetic shielding in apparatus 800, the laminated portion 814 of the shields 820, 822 may, according to various embodiments, account for as great a portion of the overall shields 820, 822 as processing (e.g., liftoff, milling, etc.) and/or tape drive functionality constraints allow. Thus, according to some embodiments, the entirety of the one or more magnetic shields may be laminated. In other words, one or both of the magnetic shields 820, 822 may not include a non-laminated magnetic portion 802 in some embodiments. According to other embodiments, the laminated portion 814 may account for a majority of the one or more magnetic shields 820, 822 while non-laminated magnetic portion 802 accounts for a minority of the one or more shields. However, according to yet further embodiments, the thickness of the laminated portion 814 may account for about 10% or less of the thickness of the overall magnetic shield 820. Accordingly, in such embodiments the non-laminated magnetic portion 802 may account for about 90% or more of the thickness of the overall magnetic shield 820.

According to preferred embodiments, the thickness $t_3$ of each of the magnetic shields 820, 822 in an intended media travel direction 824 may be 2 to about 10 times a media wavelength of a frequency of a recording code compatible with the sensor structure 812, and in some approaches is 2 to about 10 times a media wavelength of a lowermost frequency of a recording code compatible with the sensor structure 812. The media wavelength of a frequency of a recording code may be described as the average pattern repetition length that resides between portions of data written to media, e.g., tape in the current embodiment. For example, according to various embodiments, the media wavelength may be about 0.2 to about 2 microns, but could be higher or lower depending on the embodiment.

Various embodiments preferably include multiple laminate pairs 816, e.g., to achieve a thickness $t_3$ of the magnetic shields 820, 822 as described above. For example, in some embodiments, apparatus 800 may include up to about 10 laminate pairs 816 on each side of the magnetic sensor structure 812 (e.g., in each magnetic shield 820, 822). It follows that the configuration of the laminate pairs 816, e.g., number of laminate pairs 816 on each side of the sensor structure 812, total number of laminate pairs 816, thickness of each individual laminate pair 816, etc., may vary depending on the embodiment. For example, embodiments associated with a low media wavelength may have magnetic shields 820, 822 with a low thickness $t_3$ (e.g., still about 5 to about 10 times the low media wavelength), thereby allowing the laminated portion 814 to account for a greater amount of the overall magnetic shields 820, 822.

As mentioned above, the magnetic shield(s) 820 and/or 822 of apparatus 800 may include a non-laminated magnetic portion 802. As illustrated in FIG. 8, each of the non-laminated magnetic portion s 802 may sandwich the laminate pairs 816 in the same shield therewith between the non-laminated magnetic portion 802 and the sensor structure 812. Although apparatus 800 includes two non-laminated magnetic portion s 802, e.g., a non-laminated magnetic portion 802 on each side of the sensor structure 812, sandwiching the laminate pairs 816 between the respective non-laminated magnetic portion 802 and the sensor structure 812, in other embodiments, only a single non-laminated magnetic portion 802 may be included on a single side of the sensor structure 812, e.g., sandwiching the corresponding laminate pairs 816 on the single side of the sensor structure 812 between the non-laminated magnetic portion s 802 and the sensor structure 812, etc. In other words, only one of the magnetic shields 820, 822 may include a non-laminated magnetic portion 802.

Second magnetic shield 822 may have similar or the same structure and/or properties as magnetic shield 820. For example, similar to magnetic shield 820, the second magnetic shield 822 may have at least two laminate pairs 816, where each pair 816 includes a magnetic layer 806 and an electrically nonconductive nonmagnetic layer 808.

In other embodiments, the number of laminate pairs 816 in the first magnetic shield 820 may be different than the number of laminate pairs 816 in the second magnetic shield 822.

Embodiments which include CPP sensors may include an electrical connection to a magnetic lamination or layer proximate to the sensor, to a spacer layer 810 positioned between the sensor structure 812 and one or both magnetic shields 820, 822, and/or to the sensor 812 itself. For example, such embodiments may include an electrical lead proximate to the sensor for enabling current flow through the sensor structure. Such lead may be an extension of a layer itself, or a separately-deposited material. Establishing an electrical connection to a magnetic lamination proximate to the sensor and/or to the spacer itself may create a configuration in which portions of the magnetic shields of an apparatus are not biased or current-carrying e.g. the shields are "floating". In such embodiments, the nonmagnetic spacer layer 810 included between the sensor structure 812 and the magnetic shield 820 may serve as an electrical lead. These portions may be biased according to various embodiments.

In some embodiments, the magnetic shield may include one or more conductive laminate pairs having a magnetic layer and an electrically conductive nonmagnetic layer. Such electrically conductive nonmagnetic layer may be used in place of a nonconductive nonmagnetic layer or layers 808, e.g., in any of the Figures.

Figure 13:
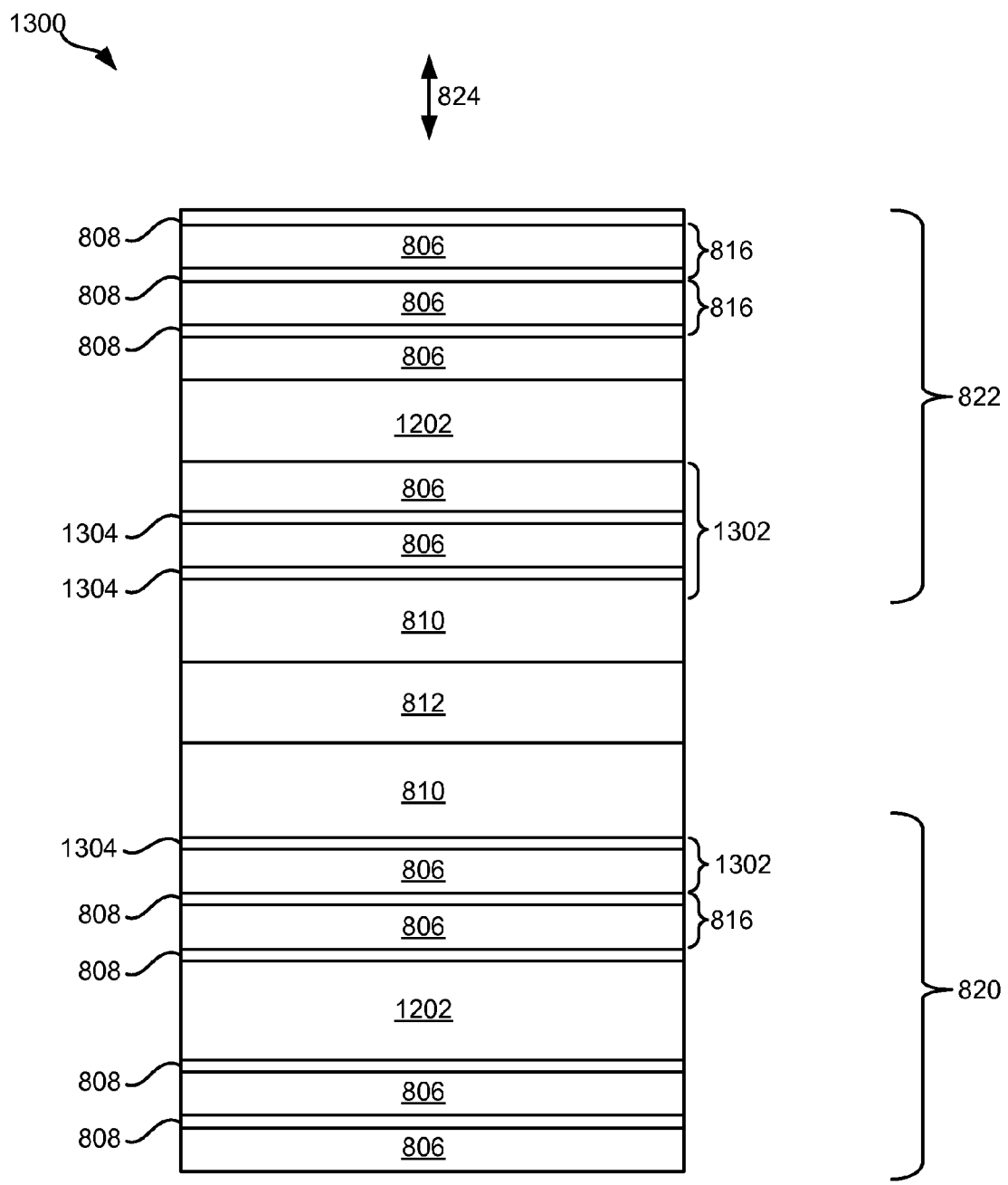
FIG. 13 is a partial side view of a media facing side of an apparatus according to another embodiment.

For example, referring to FIG. 13, a structure 1300 may include a shield 820 and/or 822 one or more nonconductive laminations 816 and conductive laminations 1302. The conductive laminations may include magnetic layers 806 and electrically conductive nonmagnetic layers.

An electrically conductive nonmagnetic layer 1304 may function as a lead in some approaches, and in such approaches is positioned to be in electrical communication with the sensor, e.g., as where the conductive laminate pair is positioned adjacent the sensor 812 or spacer layer 810. Any conventional conductive nonmagnetic material may be used in the conductive nonmagnetic layer of a conductive laminate pair, such as copper, a copper alloy, iridium (Ir), tantalum (Ta), titanium (Ti), ruthenium (Ru), etc. Such nonmagnetic conductive layer may extend beyond edges of other layers in the shield structure in any conventional manner, e.g., in the height direction and/or cross-track direction, to enable coupling thereof to a pad at a surface of the head, e.g., for connection to a cable.

According to further embodiments, the magnetic sensor structure 812 may be a current in plane (CIP) sensor structure.

Figure 9A:
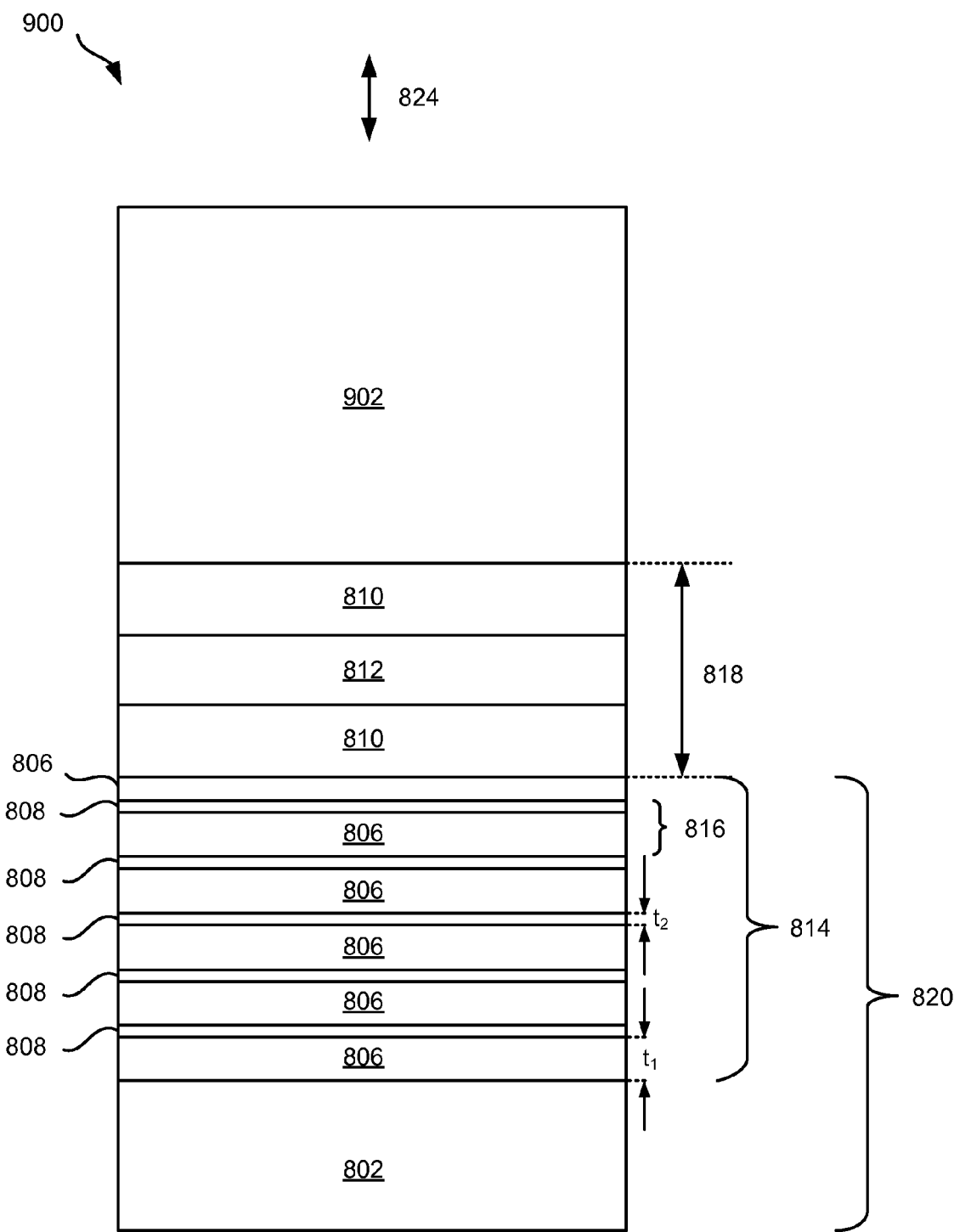
FIG. 9A is a partial side view of a media facing side of an apparatus according to one embodiment.

According to another embodiment, the second magnetic shield 822 may not have laminate pairs 816 of magnetic layers 806 and electrically nonconductive nonmagnetic layers 808. For example, looking to FIG. 9A, in addition to having a magnetic shield 820 with a laminated portion 814, an exemplary apparatus 900 is illustrated as having a second magnetic shield 902 formed above the sensor structure 812 without laminate pairs 816 of magnetic layers 806 and electrically nonconductive nonmagnetic layers 808. Rather, the entirety of the second magnetic shield 902 is monolithic, e.g., a plated portion, a sputtered portion, etc. According to some instances, embodiments having one of the magnetic shields without laminate pairs 816 (e.g., such as the one illustrated in FIG. 9A), may be implemented in a servo reader of a writer head or any other type of magnetic head described and/or suggested herein.

Figure 9B:
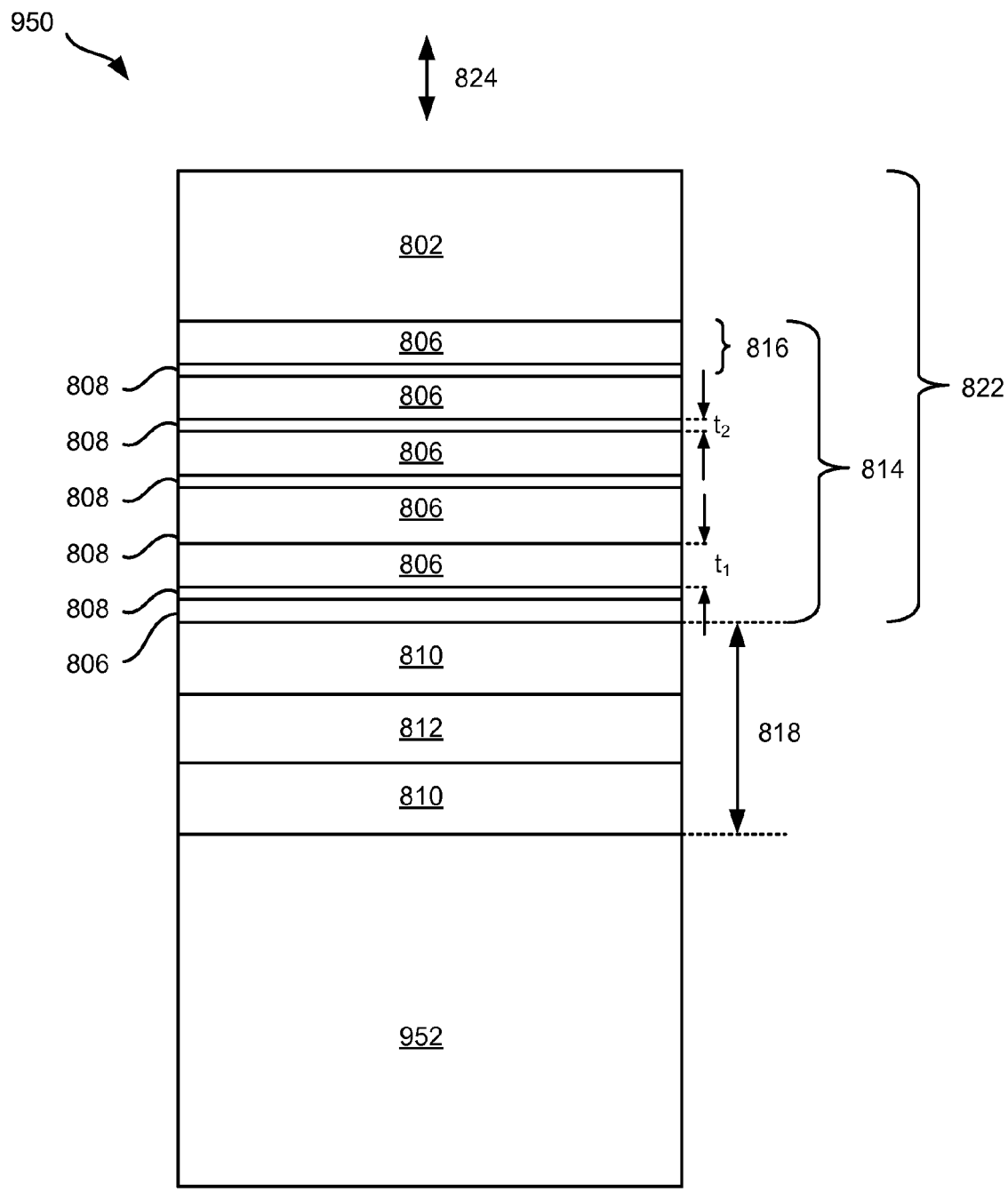
FIG. 9B is a partial side view of a media facing side of an apparatus according to one embodiment.

Alternatively, looking to FIG. 9B, an apparatus 950 may include a magnetic shield 952 formed below the sensor structure 812 without laminate pairs 816 of magnetic layers 806 and electrically nonconductive nonmagnetic layers 808. Rather, the entirety of the second magnetic shield 902 may be a non-laminated magnetic portion while the magnetic shield 822 above the sensor structure 812 includes a laminated portion 814.

It should be noted that one or more of the magnetic shields 820, 822 may have a different structure than those described above, e.g., depending on the desired embodiment. For example, in some embodiments, one or more of the magnetic shields 820, 822 may include one or more laminated pairs on both sides of a non-laminated magnetic portion, thereby sandwiching the non-laminated magnetic portion along the deposition direction (e.g., media travel direction 824).

Figure 10:
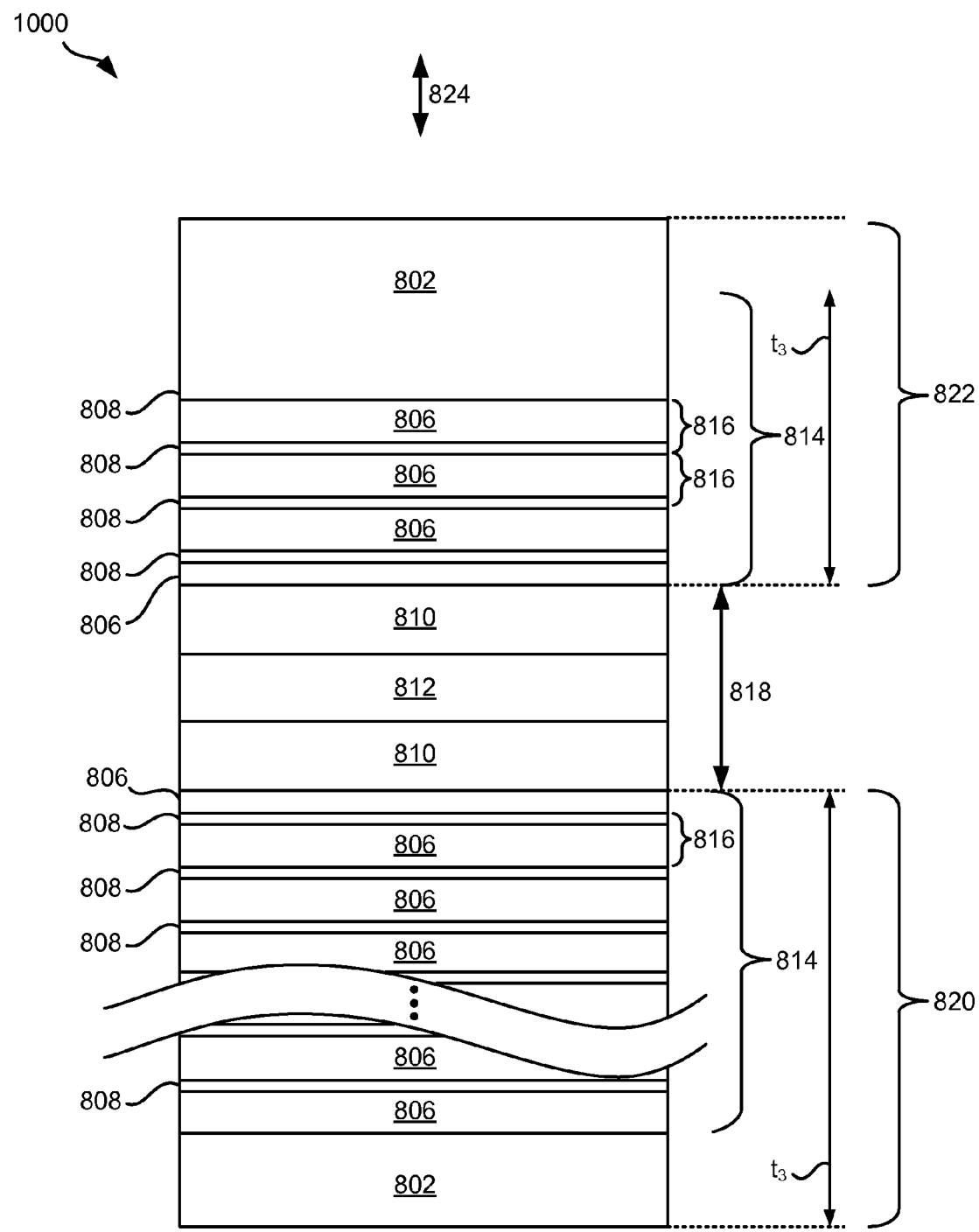
FIG. 10 is a partial side view of a media facing side of an apparatus according to another embodiment.

As noted above, the number of laminate pairs 816 in the first magnetic shield 820 may be different than the number of laminate pairs 816 in the second magnetic shield 822. For example, as shown in FIG. 10, the lower magnetic shield 820 has more laminate pairs 816 than the upper magnetic shield 822.

Figure 11:
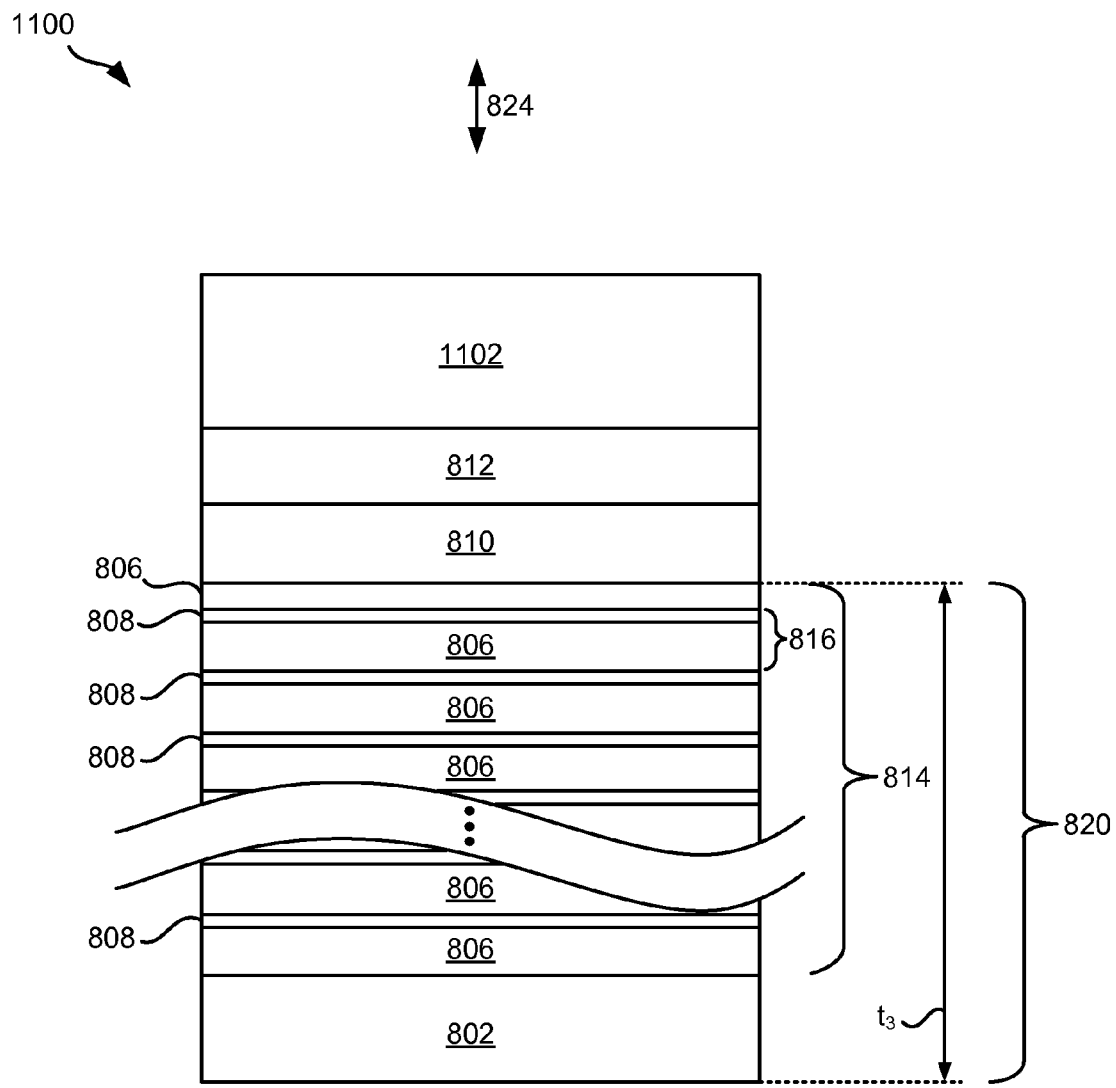
FIG. 11 is a partial side view of a media facing side of an apparatus according to another embodiment.

In further embodiments, a structure may have only a single magnetic shield, which may be above or below the sensor structure. For example, as shown in FIG. 11, a structure 1100 may have only a lower magnetic shield 820. A nonmagnetic conductor layer 1102 is positioned above the sensor 812, thereby providing an electrode for the sensor 812. Equivalently, a shield structure may be formed above the sensor structure, where no shield structure is below the sensor structure.

Figure 12:
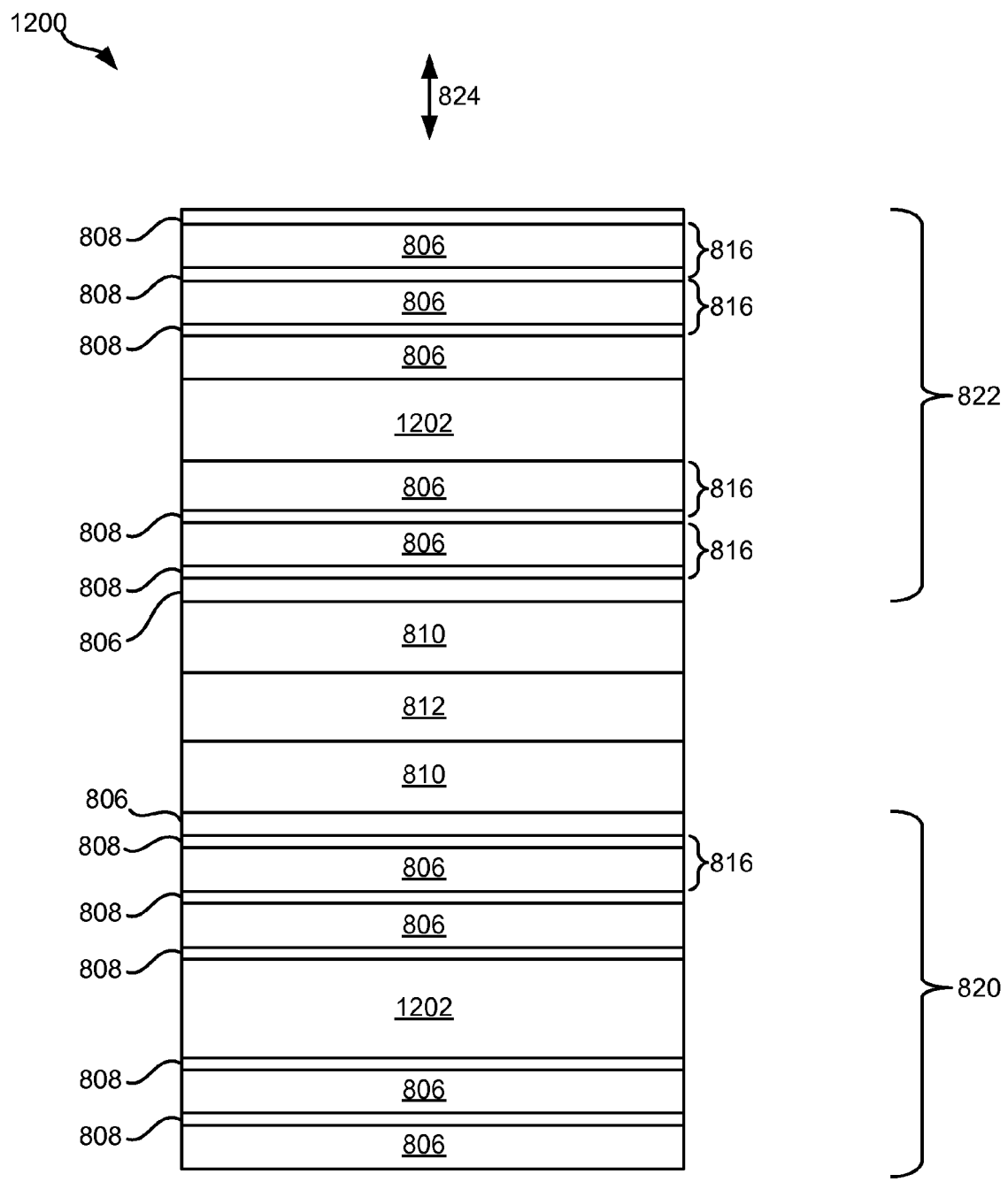
FIG. 12 is a partial side view of a media facing side of an apparatus according to another embodiment.

In yet other embodiments, such as the embodiment 1200 shown in FIG. 12, a magnetic shield 820 and/or 822 may have a nonlaminated magnetic portion 1202 sandwiched by one or more laminate pairs 816 positioned thereabove and therebelow. This embodiment makes the respective shields more robust. When designing such shield structures, one should consider the bending stiffness, which is proportional to the Young's modulus of the structure and the cube of the thickness of the film(s).

Embodiments described herein may advantageously protect the tape head of tape drive (e.g., see 100 of FIG. 1A) from, e.g., erosion, smearing, scratches, etc., which may cause electrical shorting events. Furthermore, the laminate pairs 816 may be implemented such that the magnetic shields (e.g., see 820, 822 of FIG. 8) have enhanced magnetic permeability and/or improved mechanical stability when compared to common highly magnetically permeable magnetic shield materials of similar dimensions.

Moreover, referring now to the magnetic stability of embodiments described herein, e.g., the configuration of apparatus 800, because the laminate pairs 816 are not continuously magnetic, magneto-striction may remain desirably low, which may ensure magnetic stability of the magnetic shields 820, 822.

Accordingly, the structure and/or materials used to form the laminate pairs 816 may advantageously provide and/or serve as a portion of an abrasion-resistant magnetic shield while preserving the functional conductivity of the corresponding tape head as well as the magnetic functionality of the magnetic shields, e.g., as seen in apparatus 800. The improved tape head functionality achieved by the various embodiments described herein is advantageous, particularly in view of conventional smearing and/or scratching of the sensor structures, which has been overcome by the present embodiments. Furthermore, the improved tape head functionality achieved by the various embodiments described herein may be especially advantageous when implemented in tunnel valve structures, which may otherwise susceptible to shorting due to smearing of conductive material across the tape head.

Preferred fabrication processes for the laminate pairs 816 and/or apparatus 800 may include, e.g., sputtering, ion beam deposition, atomic layer deposition, etc. Furthermore, the laminate pairs 816 may be fabricated by full film masking a stack of the laminate pairs 816, and then milling and/or liftoff processing the resulting structure to the desired width. Depositions, e.g., of the laminate pairs 816, of the magnetic shields 820, 822, etc., may be performed sequentially in a multi-target vacuum system, with or without magnetic field enhancement. Depositions may alternatively be performed in a continuous sputtering system, e.g., for example where the sputtering occurs onto a wafer on a rotating table, etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   a magnetic sensor structure;
   a magnetic shield having at least two laminate pairs, each laminate pair comprising a magnetic layer and an electrically nonconductive nonmagnetic layer; and
   a nonmagnetic spacer layer between the sensor structure and the magnetic shield,
   wherein the magnetic shield further includes a non-laminated magnetic portion sandwiching the laminate pairs between the non-laminated magnetic portion and the sensor structure.

2. An apparatus as recited in claim 1, wherein at least some of the nonconductive nonmagnetic layers comprise a material selected from a group consisting of $Al_2O_3$, CrO, $Si_3N_4$, TiO and MgO.

3. An apparatus as recited in claim 1, wherein a thickness of the magnetic shield in a media travel direction is about 2 to 10 times a media wavelength of a frequency of a recording code compatible with the sensor structure.

4. An apparatus as recited in claim 1, wherein a deposition thickness of the nonconductive nonmagnetic layer in each laminate pair is between about 1 and about 12 nanometers.

5. An apparatus as recited in claim 4, wherein a deposition thickness of the magnetic layer in each laminate pair is between about 5 and about 100 nanometers.

6. An apparatus as recited in claim 4, wherein a deposition thickness of the nonconductive nonmagnetic layer in each laminate pair is about 10% or less of a total deposition thickness of the laminate pair.

7. An apparatus as recited in claim 1, wherein a deposition thickness of the nonconductive nonmagnetic layer in each laminate pair is about 10% or less of a total deposition thickness of the laminate pair.

8. An apparatus as recited in claim 1, wherein the magnetic shield is below the sensor structure, and further comprising a second magnetic shield above the sensor structure and a second nonmagnetic spacer between the sensor structure and the second magnetic shield, the second magnetic shield having at least one laminate pair comprising a magnetic layer and an electrically nonconductive nonmagnetic layer.

9. An apparatus as recited in claim 1, wherein the magnetic shield is below the sensor structure, and further comprising a second magnetic shield above the sensor structure, the second magnetic shield not having laminate pairs of magnetic layers and electrically nonconductive nonmagnetic layers.

10. An apparatus as recited in claim 1, wherein the magnetic shield is above the sensor structure, and further comprising a second magnetic shield below the sensor structure, the second magnetic shield not having laminate pairs of magnetic layer and electrically nonconductive nonmagnetic layers.

11. An apparatus as recited in claim 1, wherein the sensor structure includes a tunnel barrier layer.

12. An apparatus as recited in claim 1, wherein the magnetic shield has at least one second laminate pair, and a nonlaminated magnetic portion sandwiched between the at least one laminate pair and the at least one second laminate pair.

13. An apparatus as recited in claim 1, wherein the magnetic shield further includes at least one conductive laminate pair comprising a magnetic layer and an electrically conductive nonmagnetic layer.

14. An apparatus as recited in claim 1, further comprising:
    a drive mechanism for passing a magnetic medium over the sensor structure; and
    a controller electrically coupled to the sensor structure.

15. An apparatus, comprising:
    a sensor structure; and
    a magnetic shield having a conductive portion and a nonconductive portion, the nonconductive portion having at least one laminate pair comprising a magnetic layer and an electrically nonconductive nonmagnetic layer,
    wherein the conductive portion has at least two laminations, one being magnetic and one being nonmagnetic.

16. An apparatus as recited in claim 15, wherein the conductive portion is in electrical communication with the sensor structure.

17. An apparatus, comprising:
    a magnetic sensor structure;
    a magnetic shield having at least one laminate pair comprising a magnetic layer and an electrically nonconductive nonmagnetic layer; and
    a nonmagnetic spacer layer between the sensor structure and the magnetic shield,
    wherein the magnetic shield further includes at least one conductive laminate pair comprising a magnetic layer and an electrically conductive nonmagnetic layer.

* * * * *